(12) United States Patent
Oshima et al.

(10) Patent No.: US 8,243,282 B2
(45) Date of Patent: Aug. 14, 2012

(54) INTERFEROMETRIC SHAPE MEASUREMENT OF DIFFERENT SIGNS OF CURVATURE

(75) Inventors: Yuki Oshima, Utsunomiya (JP); Kenji Yamazoe, Berkeley, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/473,626

(22) Filed: May 28, 2009

(65) Prior Publication Data
US 2009/0296101 A1 Dec. 3, 2009

(30) Foreign Application Priority Data
May 29, 2008 (JP) .................. 2008-140559

(51) Int. Cl.
*G01B 9/02* (2006.01)
(52) U.S. Cl. ....................................... 356/512
(58) Field of Classification Search .......... 356/511–513, 356/515
See application file for complete search history.

(56) References Cited

U.S. PATENT DOCUMENTS

| | | | |
|---|---|---|---|
| 5,004,346 A * | 4/1991 | KuMichael | 356/513 |
| 6,781,700 B2 | 8/2004 | Kuchel | |
| 6,956,657 B2 | 10/2005 | Golini | |
| 6,992,779 B2 * | 1/2006 | Ueki | 356/512 |

FOREIGN PATENT DOCUMENTS

JP 2004-125768 A 4/2004

* cited by examiner

*Primary Examiner* — Hwa Lee
(74) *Attorney, Agent, or Firm* — Canon USA, Inc., IP Division

(57) ABSTRACT

A measurement method of the present invention is a measurement method for measuring a shape of a target T from an interference pattern generated by interference between a reflected light of the target and a reference spherical surface. The measurement method includes a first measurement step which positions the target T in a first region 30a at a light source side with respect to a focal position 20 of the reference spherical surface to measure the interference pattern, and a second measurement step which positions the target T in a second region 30b opposite to the first region with respect to the focal position 20 of the reference spherical surface to measure the interference pattern.

11 Claims, 11 Drawing Sheets

INTERFEROMETRIC SHAPE MEASUREMENT OF DIFFERENT SIGNS OF CURVATURE

BACKGROUND OF THE INVENTION

1. Field of the Invention

The present invention relates to a measurement method for measuring a shape of a target from an interference pattern generated by interference between reflected light of the target and a reference spherical surface without making physical contact, and more particularly to a measurement method for measuring a shape of a gull wing type target.

2. Description of the Related Art

Recently, since an aspherical surface lens is adopted to an optical system such as a camera lens, the number of the lenses is reduced (reduction of the cost), the aberration is lowered, and the lens group is miniaturized. Therefore, the measurement of the aspherical surface shape is necessary, and a variety of measurement methods for measuring the aspherical surface have been proposed.

The measurement method for measuring the aspherical surface shape is roughly categorized into two. A first measurement method is a contact type method, which is a method of tracing a target surface by a probe. This method has small limitations for the shape, and has an advantage that a target which has a large amount of an aspherical surface or a complicated shape which does not have the symmetry can be comparatively easily measured. On the other hand, there is a disadvantage that it takes long measurement time and it possibly damages the target because of physically tracing the points.

A second method is a non-contact type method, and an interference measurement using light is typical. There are advantages in the non-contact type method that it takes comparatively short measurement time because the range radiated by the light can be collectively measured and that the target is not be damaged because of the non-contact type method. On the other hand, there is a disadvantage that the measurement of the target having a complicated shape is difficult.

According to a spherical surface interference method that is one example of non-contact type method, the difference between the reference wave surface and the shape of the target can be measured by analyzing an interference pattern obtained by the interference between the reference wave surface from a transmissive spherical surface made with high accuracy and the target. Since the spherical surface interference method can change the radius of curvature of the reference wave surface by changing the relative distance between the transmissive spherical surface and the target, it has characteristics that a lot of targets can be measured using one transmissive spherical surface.

When the target has an aspherical surface, it can not be easily measured unlike the case for the spherical surface. In this point, as a method for extending the spherical surface interference method to the aspherical surface, there are, for example, U.S. Pat. No. 6,781,700 and Japanese Patent Laid-Open No. 2004-125768.

U.S. Pat. No. 6,781,700 discloses a measurement method of an aspherical surface shape that has an axially symmetric design value. When the target having the axially symmetric aspherical surface shape is scanned in an optical axis direction, an annular-shaped interference pattern appears in a certain region. The shape of the target is measured by measuring the annular-shaped interference pattern more than once to mathematically calculate the shape of the target.

Japanese Patent Laid-Open No. 2004-125768 discloses that a target is divided into a plurality of partial regions to measure each of the regions. The measured partial regions are joined to measure the whole shape of the target. Hereinafter, in the specification, joining the partial regions is referred to as stitching. An interferometer is used for measuring each of the partial regions. In this case, the measurement of the shape is performed while tilting the target to be virtually approximated to an aspherical surface.

Although both U.S. Pat. No. 6,781,700 and Japanese Patent Laid-Open No. 2004-125768 measure the target having an aspherical surface, the aspherical surface shape is limited to either one of a convex shape and a concave shape. When a target is a shape where the convex shape and the concave shape are mixed such as a gull wing type shape (a free-form surface), the whole shape of the target can not be measured. Although such a target can be comparatively easily measured by using a contact type method, it is difficult to measure it by using a non-contact type method.

BRIEF SUMMARY OF THE INVENTION

The present invention provides a measurement method which measures a target having a free-form surface without making physical contact.

A measurement method as one aspect of the present invention is a measurement method for measuring a shape of a target from an interference pattern generated by interference between a reflected light of the target and a reference spherical surface. The measurement method includes a first measurement step which positions the target in a first region at a light source side with respect to a focal position of the reference spherical surface to measure the interference pattern, and a second measurement step which positions the target in a second region opposite to the first region with respect to the focal position of the reference spherical surface to measure the interference pattern.

Further features and aspects of the present invention will become apparent from the following description of exemplary embodiments with reference to the attached drawings.

DETAILED DESCRIPTION OF THE PREFERRED EMBODIMENTS

Figure 1:
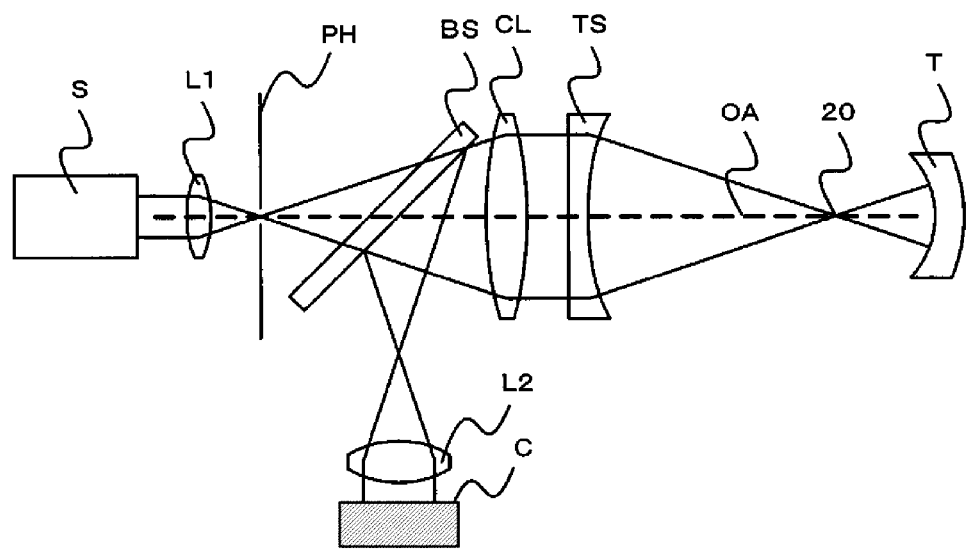
FIG. 1 is a view showing a configuration of a typical interferometer used for a measurement method of the present embodiment.

Exemplary embodiments of the present invention will be described below with reference to the accompanied drawings. In each of the drawings, the same elements will be denoted by the same reference numerals and the duplicate descriptions thereof will be omitted.

First, an interferometer used for a measurement method of the present embodiment will be described. FIG. 1 shows a configuration of a typical interferometer used for the measurement method of the present embodiment.

An interferometer 100 is what is called a Fizeau type interferometer. The interferometer 100 has a quasi-monochromatic light source S, and light emitted from the light source S is condensed in a pinhole PH through a lens L1. The light transmitted through the pinhole PH is diffused to be parallel light by a collimator lens CL after transmitting through a beam splitter BS.

Part of the parallel light is reflected on a reference spherical surface forming lens TS. The remaining parallel light transmits through the reference spherical surface forming lens TS. The reflected light on the reference spherical surface forming lens TS is reference light, and the transmitted light transmitted through the reference spherical surface forming lens TS is target light.

The reference light reflected on the reference spherical surface forming lens TS is reflected on the beam splitter BS to enter an image pickup device C through a lens L2. On the other hand, the target light transmitted through the reference spherical surface forming lens TS enters the target T to be reflected. Reference sign OA denotes an optical axis and reference numeral 20 denotes a focal position of the reference spherical surface.

The light reflected on the target T transmits through the reference spherical surface forming lens TS and a collimator lens CL. The light transmitted through the collimator lens CL is reflected on the beam splitter BS and enters the image pickup element C through the lens L2.

Since the reference light reflected on the reference spherical surface forming lens TS and the target light transmitted through the reference spherical surface forming lens TS to be reflected on the target T have a coherency, an interference pattern is formed on the image pickup device C. Therefore, the shape of the target T can be recognized by analyzing the interference pattern formed on the image pickup device C.

However, the shape of the target T which can be recognized by such a method is a difference with respect to the reference wave surface. Therefore, in principle, the measurable shape of the target T is limited to a shape approximate to that of the reference wave surface. If the target T has a comparatively complicated shape such as an aspherical surface, a reference wave surface approximate to the shape needs to be formed or an observable partial interference pattern needs to be used.

Since it is difficult to make a reference spherical surface forming lens TS which generates a reference aspherical surface, the present embodiment uses a part of the reference spherical surface. In this case, when the position of the target T is changed, the radius of curvature of the reference spherical surface entering the target T changes. When the radius of curvature of the reference spherical surface matches that of the target T, a measurable low-density interference pattern is formed on the image pickup device C and the interference pattern can be observed.

When the target T has a spherical surface, the interference pattern can be observed over a whole surface of the target T by placing the target T at a certain position. Therefore, when the target T has a spherical surface, the shape can be comparatively easily measured.

However, when the target T has an aspherical surface, the radius of curvature of the target T changes from the center of the target T to the periphery. Therefore, a low-density interference pattern formed by the interference with respect to the reference spherical surface can be obtained only in a partial region which has a radius of curvature similar to that of the reference spherical surface. Therefore, when the target T has an aspherical surface, it is difficult to measure the shape. In particular, when the target T has a shape such as a gull wing type which includes both of a convex shape and a concave shape, the measurement of the shape is extremely difficult.

In the present invention, a measurement method including at least the following first and second measurement steps is used. The first measurement step is a measurement step which places the target in a first region at a light source side with respect to a focal position of the reference spherical surface to measure an interference pattern. The second measurement step is a measurement step which places the target in a second region opposite to the first region with respect to the focal position of the reference spherical surface to measure the interference pattern.

Embodiment 1

Next, referring to the drawings, a measurement method of embodiment 1 of the present invention will be described.

Figures 2A, 2B:
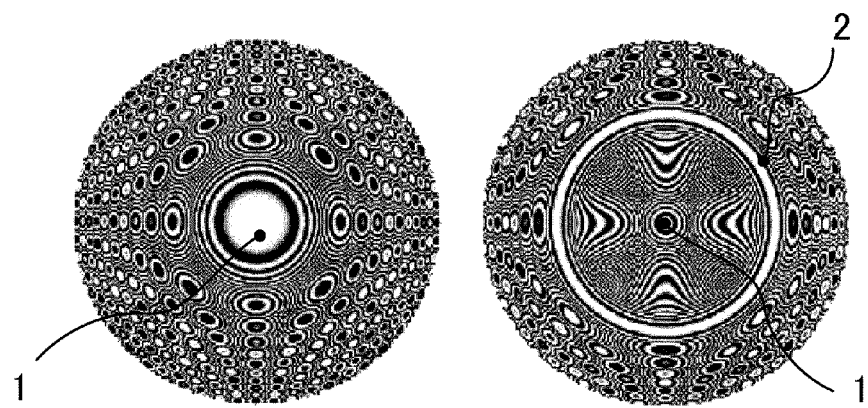
FIGS. 2A and 2B are views showing an interference pattern obtained when measuring an aspherical surface with an interferometer.

FIGS. 2A and 2B are views showing an interference pattern obtained when measuring an aspherical surface with an interferometer. When the shape of a target T is an axially symmetric aspherical surface, regions where the density of the interference pattern is low and high appear in accordance with the radius of curvature of a reference spherical surface. For example, when the distance between a focal position 20 of the reference spherical surface and the target T is equal to the radius of curvature at the center of target T, the interference pattern as shown in FIG. 2A is obtained. In the region near the center where the radius of curvature is similar to that of the reference spherical surface, an interference pattern 1 whose density is low is obtained. However, in other regions, a moire pattern appears because the density of the interference pattern is high. Therefore, a correct interference pattern can not be obtained.

When the distance between the focal position 20 of the reference spherical surface and the target T is displaced from the radius of curvature at the center of the target T, the interference pattern shown in FIG. 2B is obtained. If the target T has an axially symmetric aspherical surface, the radius of curvature differs in accordance with the distance from the center of the target T. Therefore, an interference pattern whose density is low can be obtained only if the radius of curvature of the target T matches that of the reference spherical surface.

In FIG. 2B, an annular-shaped interference pattern 2 is obtained. It means that the radius of curvature of the target T matches that of the reference spherical surface only in the annular-shaped region where the interference pattern 2 is formed. The interference pattern 1 in the vicinity of the center shown in FIG. 2B is always obtained regardless of the radius of curvature of the reference spherical surface.

When the position of the target T moves in an optical axis direction (the relative distance between the reference spherical surface forming lens TS and the target T is changed), the shape (the region) of the annular-shaped interference pattern is gradually changed. In U.S. Pat. No. 6,781,700, the relation between the annular-shaped interference pattern and the shape of the aspherical surface is represented by an expression, and it is used for obtaining the shape of the aspherical surface.

Figure 3:
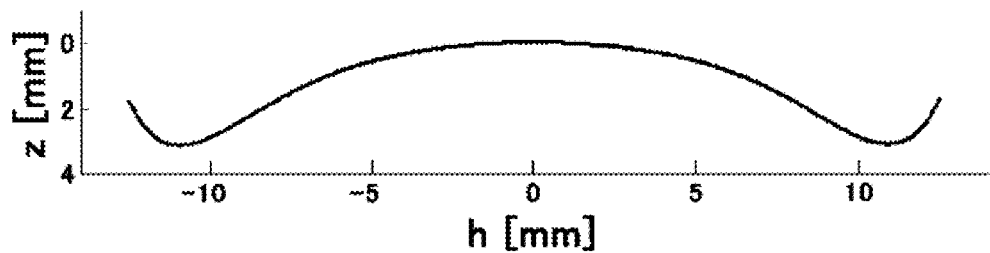
FIG. 3 is a cross-sectional view showing a target having a free-form surface in the present embodiment.

FIG. 3 is a cross-sectional view showing the target T having a free-form surface in the present embodiment. The vertical axis represents the height z of the target T, and the horizontal axis represents the width h of the target T.

As shown in FIG. 3, the target T is an aspherical surface that is a free-form surface (gull wing type) having a convex-shaped center part and a concave-shaped peripheral part. Thus, when the target T has a gull wing type shape where the sign of the radius of curvature is inverted (the radius of curvature changes from a convex shape to a concave shape), the shape can not be easily obtained by a conventional method.

Figure 4:
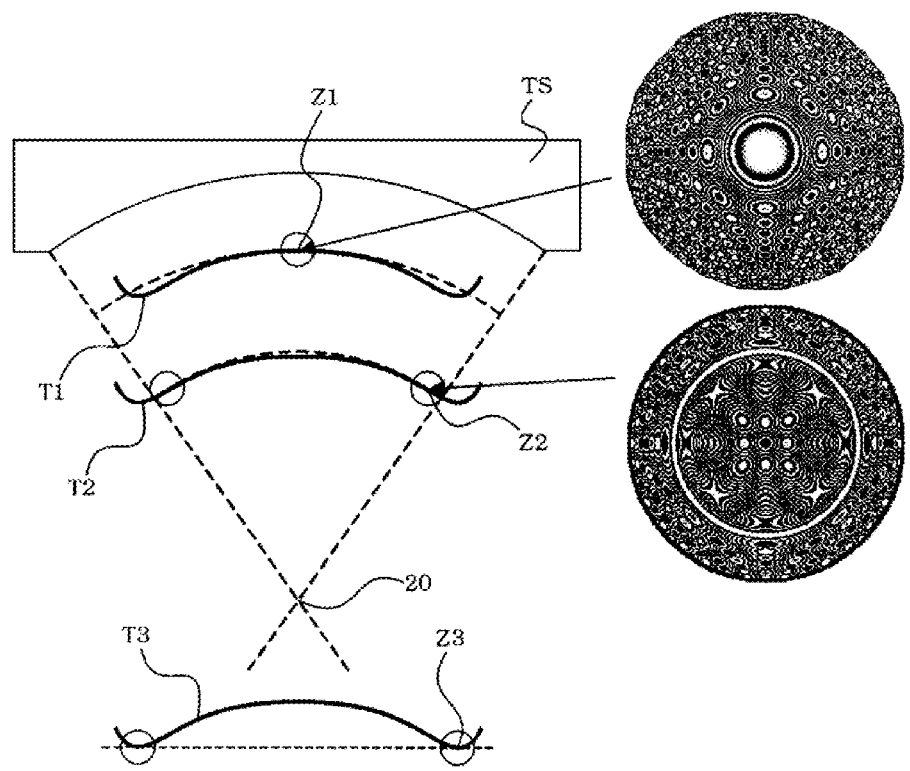
FIG. 4 is a view showing a relationship between a position of a target and an interference pattern when measuring the target having an aspherical surface with an interferometer.

FIG. 4 is a view showing a relationship between the position of the target and the interference pattern when measuring the target having an aspherical surface with an interferometer.

As shown in FIG. 4, when the target T is placed at a position T1 where a shape Z1 of the center part is measurable, the approximate radius of curvature of the shape Z1 of the center part matches the radius of curvature of the reference spherical surface. Therefore, as shown in the upper right of FIG. 4, an interference pattern for the shape Z1 of the center part is obtained.

When the target T is placed at a position T2 where a shape Z2 of the peripheral part is measurable, the approximate radius of curvature of the shape Z2 of the peripheral part matches the radius of curvature of the reference spherical surface. Therefore, as shown to the right in FIG. 4, an annular-shaped interference pattern for the shape Z2 of the peripheral part is obtained.

On the other hand, a shape Z3 in the vicinity of the position where the sign of the radius of curvature of the target T is inverted is a shape that has the extremely large radius of curvature (similar to a plane surface). Therefore, a position T3 where the shape Z3 in the vicinity of the position where the sign of the radius of curvature of the target T is inverted is measurable exists at infinity. Therefore, it is difficult to obtain the reference spherical surface that has the same radius of curvature as that of the shape Z3. As a result, the shape away from the shape Z3 in the vicinity of the position where the sign of the radius of curvature is inverted can not be measured.

Figure 5:
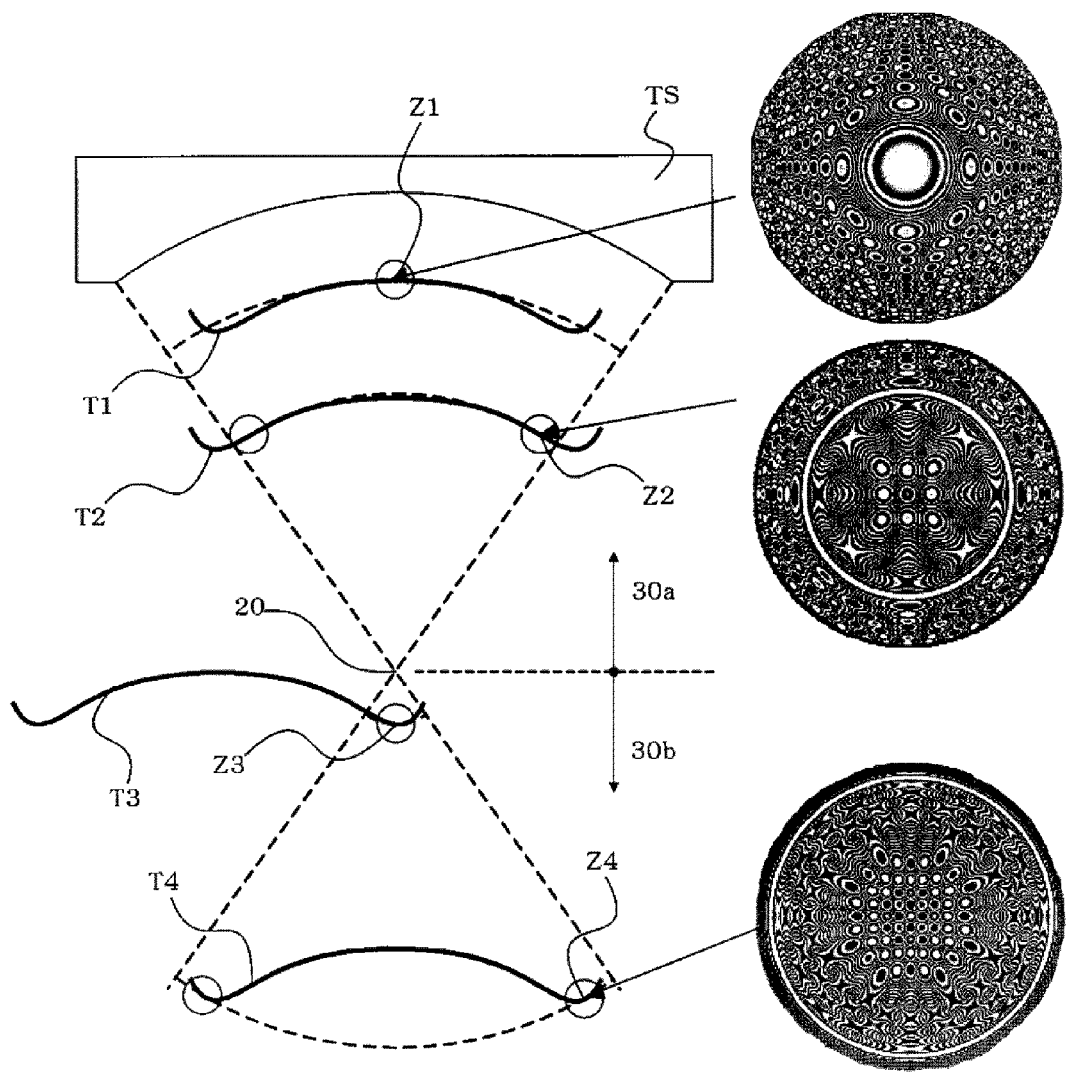
FIG. 5 is a view showing a relationship between a position of a target and an interference pattern when measuring the target having a free-form surface with an interferometer.

FIG. 5 is a view showing a relationship between a position of a target and an interference pattern when measuring the target having a free-form surface with an interferometer.

As shown in FIG. 4, in the target having the free-form surface, there is an region where the measurement is difficult. However, as shown in FIG. 5, when scanning in an opposite direction with respect to the focal position 20 (the origin) of the reference spherical surface, the target can be placed at a position T4 where a shape Z4 away from the shape where the sign of the radius of curvature of the target T is inverted is measurable.

For example, like the shape Z1 or Z2, the shape of a part having the convex-shaped radius of curvature is measured in a first region 30a which is positioned between the reference spherical surface forming lens TS and the focal position 20 of the reference spherical surface. On the other hand, like the shape Z4, the shape of a part having the concave-shaped radius of curvature is measured in a second region 30b which is opposite to the first region 30a with respect to the focal position 20 of the reference spherical surface. As a result, the shape Z4 away from the shape Z3 near the position where the sign of the radius of curvature is inverted can be obtained.

Because the shape Z3 near the region where the sign of the radius of curvature of the target T is inverted has the large radius of curvature (similar to a plane surface), it is difficult to measure the shape at any rate. However, a whole shape of the target T can be measured by supplementing (predicting) the shape Z3 from the measurement result before and after the inversion of the sign of the radius of curvature.

With regard to the shape Z3 near the region where the sign of the radius of curvature of the target T is inverted, data of the shapes of the target T can also be supplemented by another step. The whole shape of the target can also be measured by, for example, measuring the interference pattern while changing the tilt of the target T with respect to an optical axis direction to supplement the shape Z3 using the measurement result. It is desirable that the measurement is performed by moving (shifting) the target T in a direction vertical to the optical axis direction.

In this case, it is necessary to monitor a moving distance of the target T to measure the radius of curvature of the reference spherical surface when obtaining each interference pattern. Furthermore, the shape of the interference pattern obtained based on a design value of the target T has been previously predicted before the measurement, and the difference with respect to the ideal value is measured.

Figure 6:
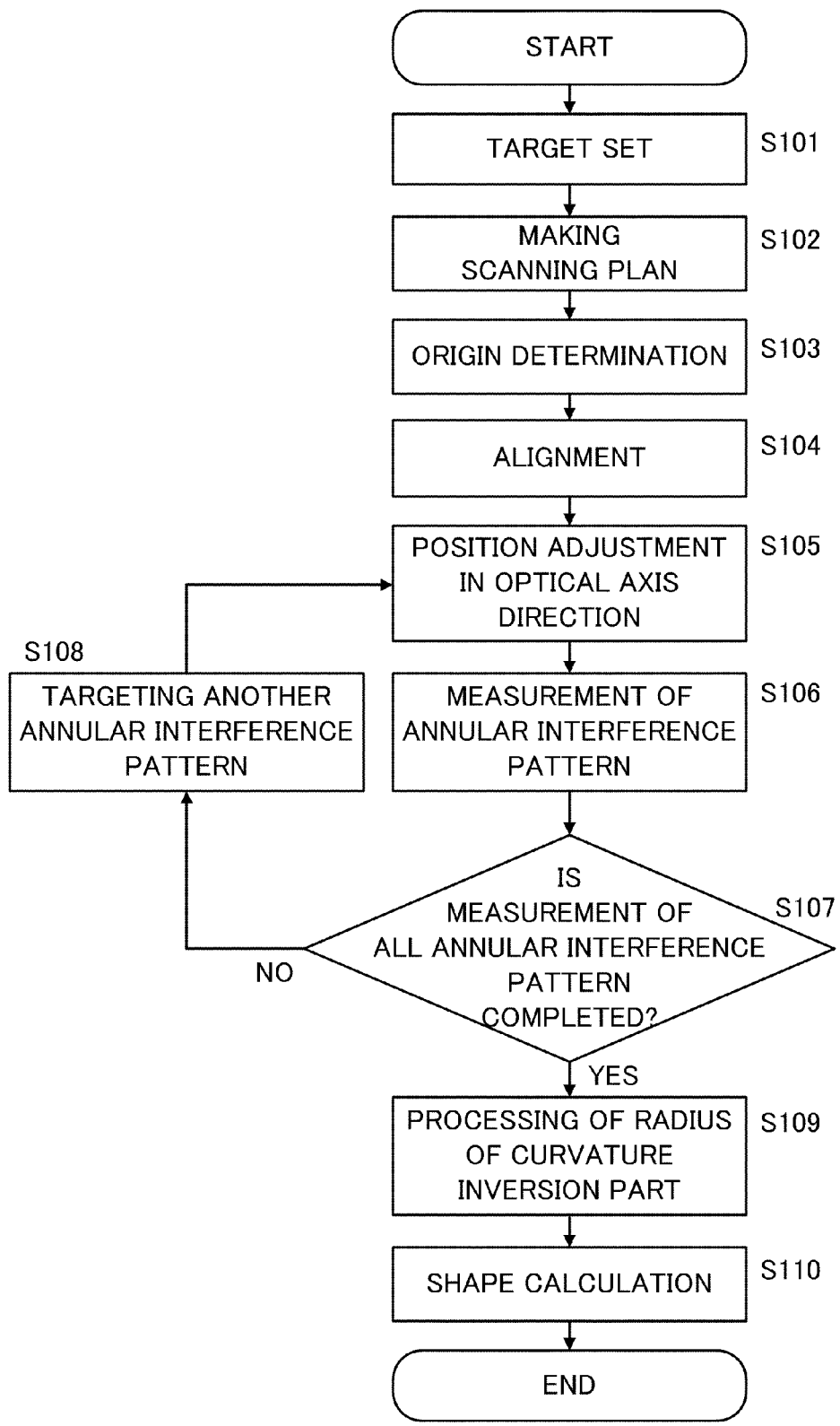
FIG. 6 is a flowchart showing a measurement method in embodiment 1.

FIG. 6 is a flowchart showing a measurement method in embodiment 1.

At Step S101, the target T is installed. In other words, the target T is physically installed on a measurement unit (an interferometer 100).

When the installation of the target T is completed, subsequently at Step S102, a scanning plan is made. Making a scanning plan means that the measuring number of the annular-shaped interference pattern or the moving distance of the target T is determined based on the design value of the target T. At subsequent steps, the target T is moved based on the scanning plan which has been made here. In the present embodiment, Step S102 at which the scanning plan is made is performed after Step S101 at which the target T is installed, but the present embodiment is not limited to this. Steps S101 and S102 are in random order, and Step S102 at which the scanning plan is made can also be performed before Step S101 at which the target T is installed.

At Step S103, the determination of the origin of the measurement is performed. In other words, a reference position when measuring the moving distance of the target T is determined. Ordinarily, as shown in FIG. 5, it is desirable that the focal position 20 of the reference spherical surface is set as the origin. Such a setting enables the subsequent processes to be easy because the moving distance from the origin corresponds to the radius of curvature of the reference surface as it is.

At Step S104, an alignment is performed. The alignment means that the adjustment between the optical axis OA and the target T is performed so that the optical axis displacement is not generated even if the target T is scanned in the optical axis direction.

At Step S105, the position adjustment of the target T in the optical axis direction is performed. The position adjustment is performed in accordance with the scanning plan made at Step S102. When the approximate radius of curvature of the annular-shaped interference pattern to be targeted is positive (convex), the target T is placed at the first region 30a at a side where the reference spherical surface forming lens TS is placed with respect to the origin. On the other hand, when the approximate radius of curvature of the annular-shaped interference pattern is negative (concave), the target T is placed at the second region 30b at a side where the reference spherical surface forming lens TS does not exist with respect to the origin. The moving distance in the optical axis direction with respect to the origin is measured.

At Step S106, the annular-shaped interference pattern is measured. In other words, the interference pattern of the target T at a place set at Step S105 is measured. Specifically, at Step S106, the following first and second measurement steps are performed. The first measurement step is a step for placing the target T in the first region 30a at a light source side with respect to the focal position 20 of the reference spherical surface to measure the interference pattern. The second measurement step is a step for placing the target T in the second region 30b which is opposite to the first region 30a with respect to the focal position 20 of the reference spherical surface to measure the interference pattern. Thus, the measurement is performed in two regions of the first region 30a and the second region 30b because the target T has a free-form surface where the sign of the radius of curvature of the target T is inverted.

At Step S107, it is determined whether or not the measurement of all the annular interference patterns is finished. In other words, in accordance with the scanning plan made at Step S102, it is determined whether or not the measurement of all the annular interference patterns is finished. If the measurement for all the interference patterns is not completed, the flow proceeds to Step S108. If the measurement for all the interference patterns is completed, it proceeds to Step S109.

At Step S108, another annular interference pattern is targeted. In other words, in accordance with the scanning plan made at Step S102, for example, position information of an annular interference pattern which has not been measured is obtained. Returning to Step S105, Steps S105 to S107 are repeated. The first and the second measurement steps described above are performed by repeating Steps S105 to S107.

At Step S109, the processing for the region where the sign of the radius of curvature is inverted is performed. In other words, the shape of the target T is supplemented in a region where the shape data can not be obtained, for example, a position where the sign of the radius of curvature is inverted. As a supplemental method, for example, there is a method of shifting the target T in a direction vertical to the optical axis OA to fill in the region using a result obtained by performing another measurement after a tilt adjustment, or a method of mathematically performing a fitting to presume an unknown shape.

Thus, Step S109 is a third measurement step that supplements the shape data of the target T when the interference pattern can not be measured at the first and the second steps at Step S105. For example, at the third measurement step, the measurement of the interference pattern is performed while changing the tilt of the target T with respect to the optical axis direction, or the movement of the target T in a direction vertical to the optical axis direction is performed.

At Step S110, the shape is obtained by a calculation. In other words, the whole shape of the target T is obtained by the calculation from a plurality of annular shapes.

As described above, according to the present embodiment, the gull wing type target T which has a free-form surface where the sign of the radius of curvature is inverted can be measured without making physical contact.

Embodiment 2

Next, referring to the drawings, a measurement method of embodiment 2 of the present invention will be described in detail.

As shown in FIG. 3, when the shape of the target T is a gull wing type aspherical surface, the sign of the radius of curvature differs between the center part and the peripheral part of the target T. In other words, the target T has a free-form surface. When the shape is measured, the measurement of the shape is difficult because reference spherical surfaces which have the different sign of the radius of curvature are necessary.

In the present embodiment, the target T is divided into partial regions so as to measure each of the partial regions. The shape of the target T with an aspherical surface is measured by stitching the result.

Figure 7:
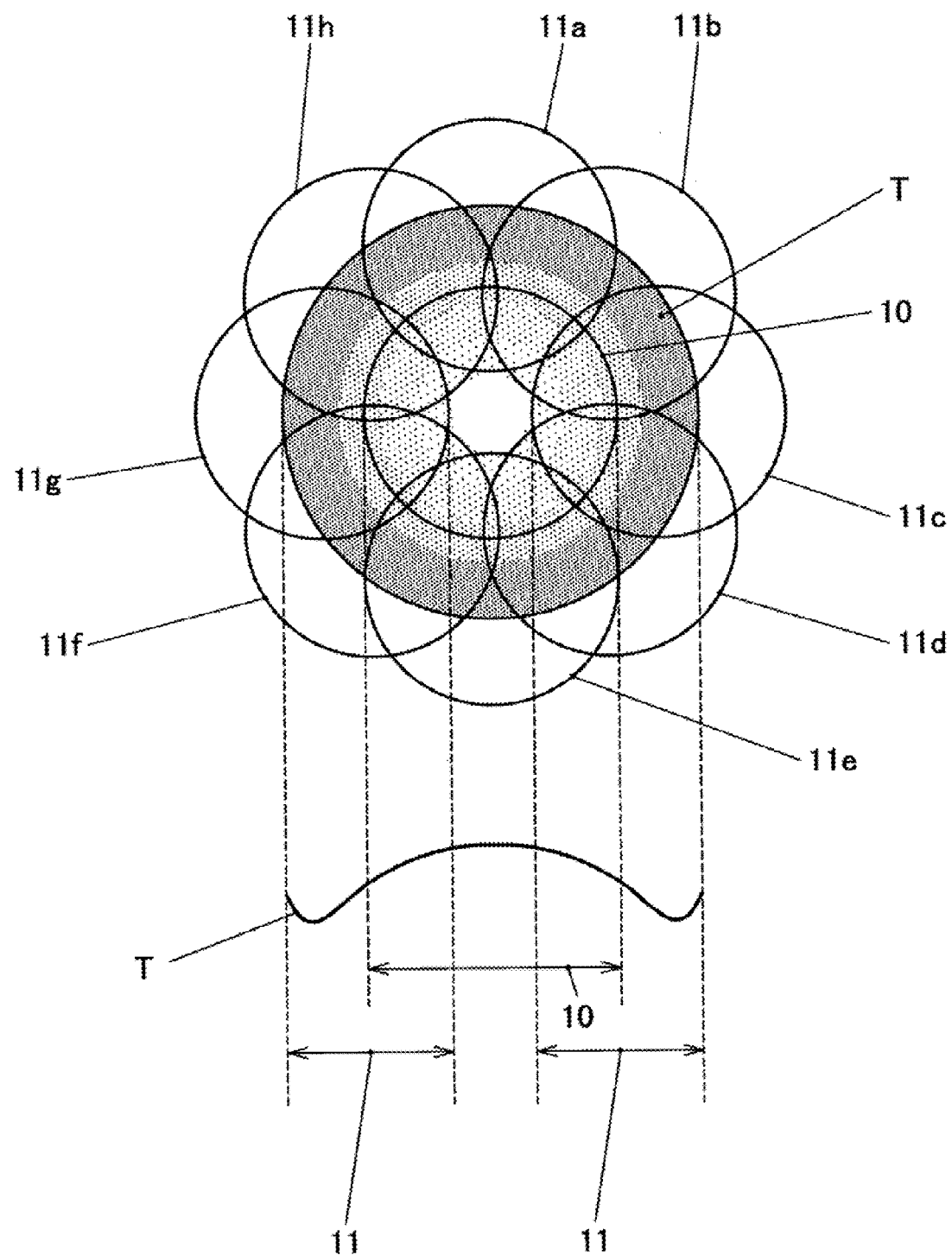
FIG. 7 is a view showing a partial region of a target in embodiment 2.

FIG. 7 is a view showing partial regions of the target in embodiment 2. The upper side in FIG. 7 shows a target which is represented by shadow, and the lower side in FIG. 7 shows its cross-sectional shape.

As shown in FIG. 7, the target T is divided into nine partial regions consisting of the center region 10 and the peripheral regions 11a to 11h so as to measure the shape. The number of the division of the partial regions is determined by the dividing plan from a design value of the target T. Thus, the number of the partial regions can increase or decrease in accordance with the shape or the size of the target T.

When each of the partial regions of the peripheral regions 11a to 11h is measured, the difference between the shape of the partial region and the reference spherical surface is large. Therefore, it is desirable that the target T is tilted to be measured so that the partial region is virtually approximated by the spherical surface to be measured. According to such a measurement method, the density of the interference pattern is reduced and the measurement is comparatively easy.

Figure 8:
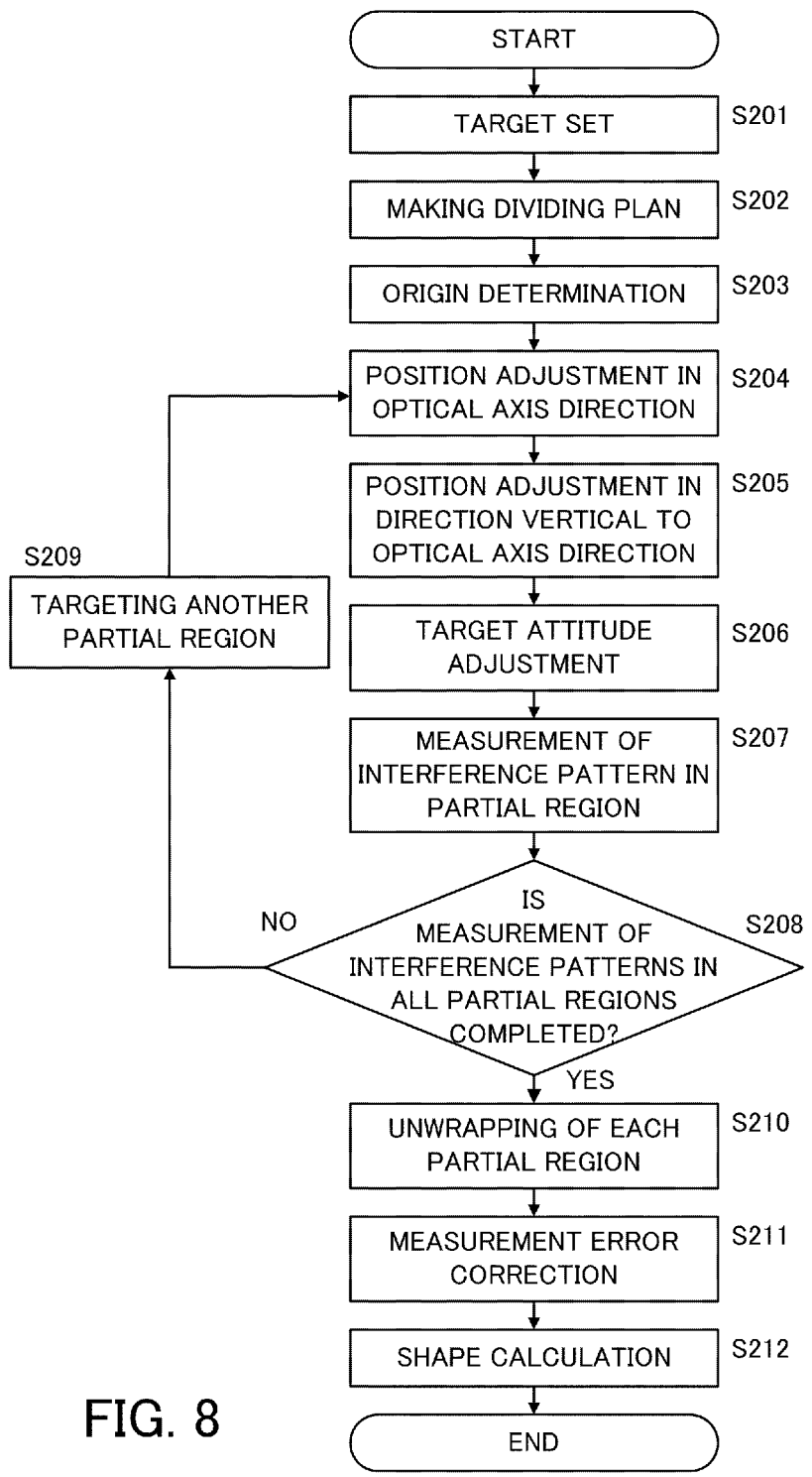
FIG. 8 is a flowchart showing a measurement method in embodiment 2.

FIG. 8 is a flowchart showing the measurement method in embodiment 2.

At Step S201, the target T is installed. In other words, the target T is physically installed on a measurement unit (an interferometer 100).

When the installation of the target T is completed, subsequently at Step S202, a dividing plan is made. In other words, based on a design value of the target T, the number of the partial regions to be divided or the position or the attitude in measuring each partial region is determined. Thus, Step S202 is a dividing step which divides the target T into a plurality of partial regions. Afterwards, the target T moves based on the dividing plan made at Step S202. Steps S201 and S202 are in random order.

Figure 9:
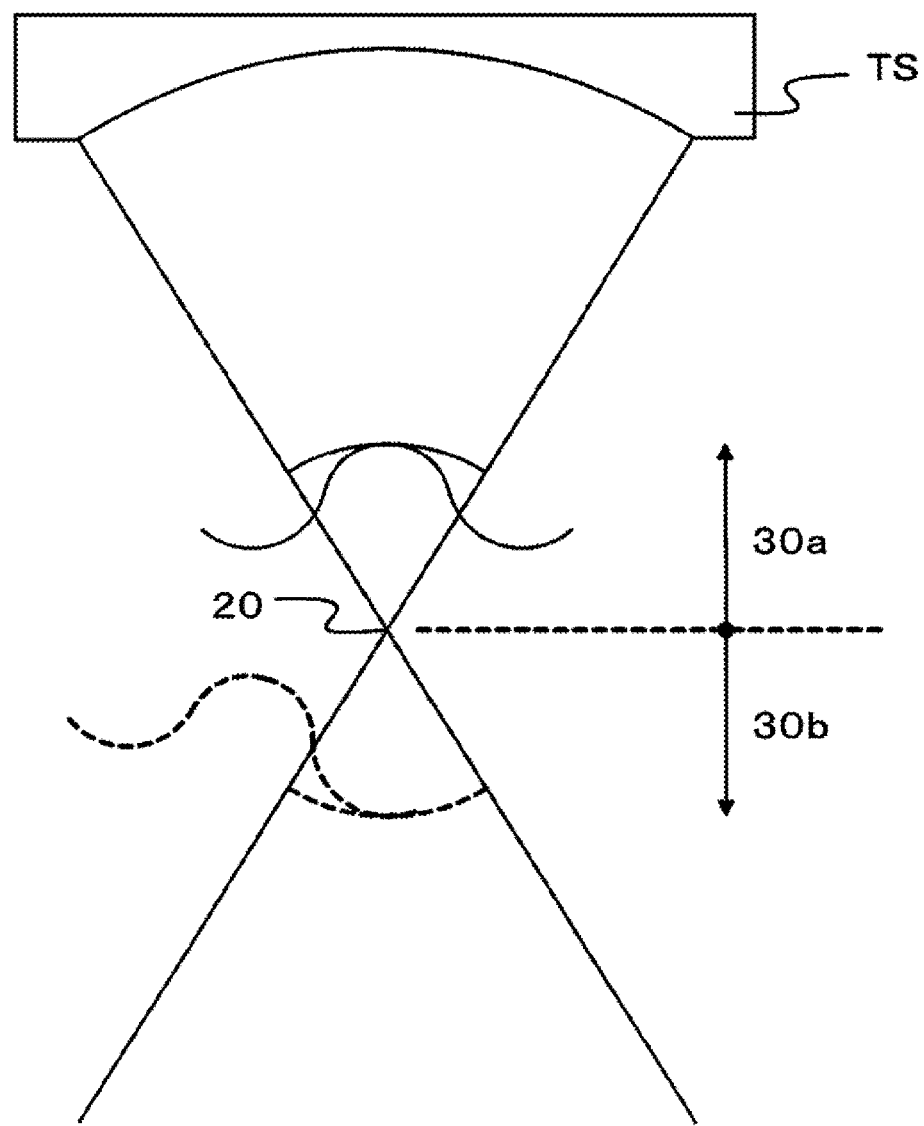
FIG. 9 is a view showing a measurement position of a target in embodiment 2.

At Step S203, an origin of the measurement is determined. In other words, a reference position in measuring the moving distance of the target T is determined. FIG. 9 is a view showing a measurement position of the target in embodiment 2. As shown in FIG. 9, ordinarily, a focal position 20 of a reference spherical surface is set as the origin. Such a setting enables the subsequent processes to be easy because the moving distance from the origin corresponds to the radius of curvature of the reference spherical surface as it is.

At Step S204, the position adjustment in an optical axis direction is performed. In other words, in accordance with the dividing plan made at Step S202, the position adjustment of the target T in the optical axis direction is performed. When the approximate radius of curvature of the partial region to be targeted is positive (convex), the target T is placed at a first region 30a that is at a side where the reference spherical surface forming lens TS is placed with respect to the origin.

On the other hand, when the approximate radius of curvature is negative (concave), the target T is placed at a second region 30b that is at a side where the reference spherical surface forming lens TS does not exist with respect to the origin. The moving distance in the optical axis direction with respect to the origin is measured.

At Step S204, at least one of the first and the second measurement steps is performed for each partial region divided at the dividing step of Step S202.

Next, at Step S205, the position adjustment in a direction vertical to an optical axis is performed. In other words, in accordance with the dividing plan made at Step S202, the position adjustment of the target T in a direction vertical to the optical axis is performed depending on the measurement position of the peripheral partial region. The moving distance in a direction vertical to the optical axis with respect to the origin is measured.

At Step S206, the tilt adjustment is performed. In other words, in accordance with the dividing plan made at Step S202, the tilt adjustment of the target T is performed depending on the shape of the peripheral partial region. Furthermore, an amount of the tilt adjustment with respect to the origin is measured. The tilt adjustment can reduces the density of the interference pattern and the measurement can be comparatively easy.

Figure 10:
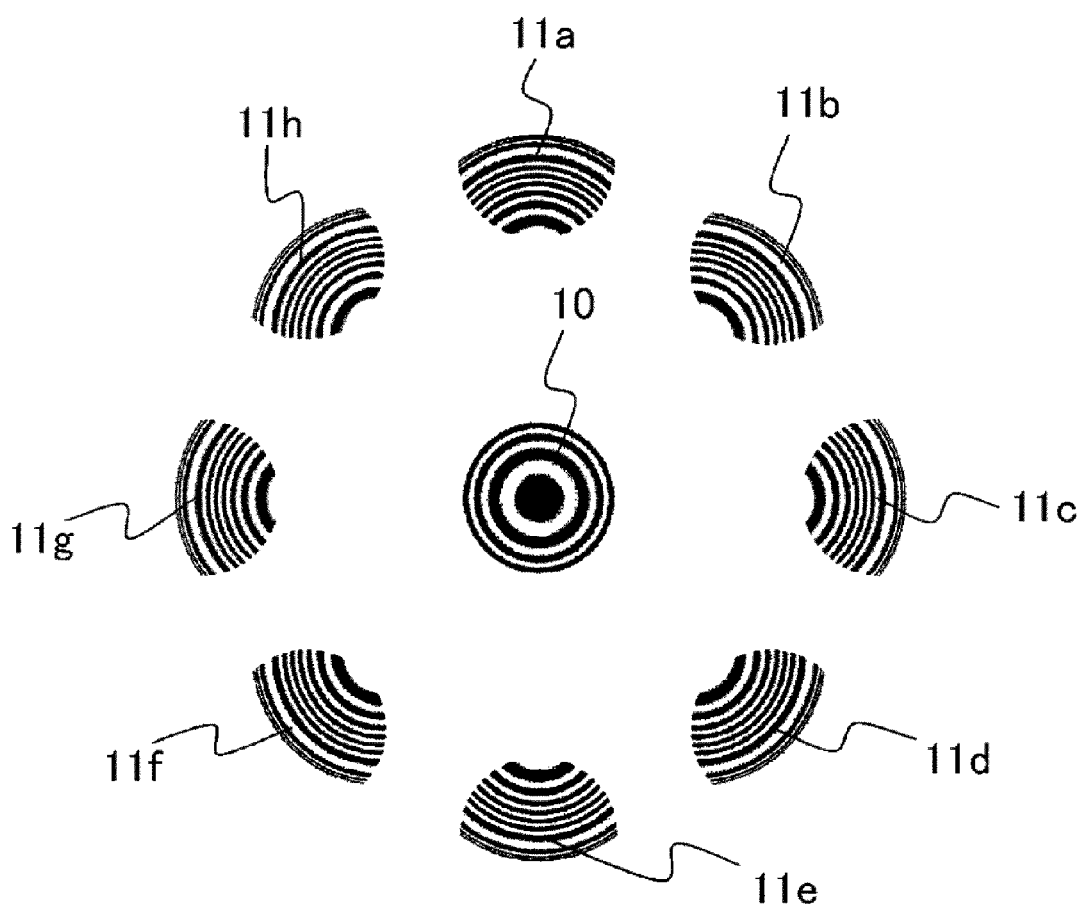
FIG. 10 is a view showing an interference pattern of each partial region in embodiment 2.
Figure 11:
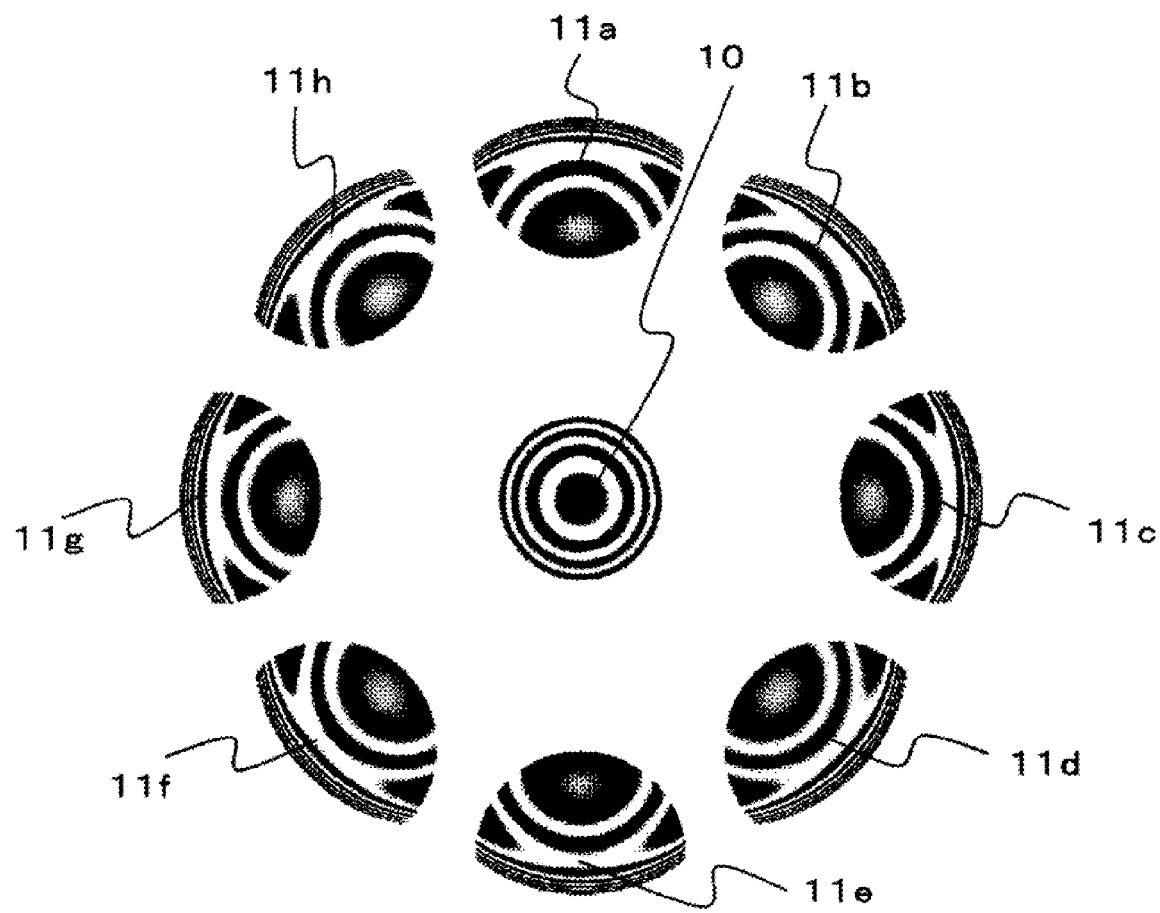
FIG. 11 is a view showing an interference pattern obtained when adjusting the tilt of each partial region in embodiment 2.

FIG. 10 shows an interference pattern of each partial region in embodiment 2. The interference pattern shown in FIG. 10 is obtained without performing a tilt adjustment for each partial region. On the other hand, FIG. 11 shows an interference pattern obtained when performing the tilt adjustment for each partial region. Comparing FIG. 10 with FIG. 11, it is found that the density of the interference pattern in the peripheral regions 11a to 11h is reduced when the tilt adjustment is performed.

Next, at Step S207, the interference pattern of the partial region to be targeted is measured. Specifically, at Step S207, the following first and second measurement steps are performed. The first measurement step is a step of positioning the target T in the first region 30a at a light source side with respect to the focal position 20 of the reference spherical surface to measure the interference pattern. The second measurement step is a step of positioning the target T in the second region 30b that is at a side opposite to the first region 30a with respect to the focal position 20 of the reference spherical surface to measure the interference pattern.

At Step S208, it is determined whether or not the measurement of the interference pattern in all partial regions is finished. In other words, in accordance with the dividing plan made at Step S202, it is determined whether or not the measurement of the interference pattern in all partial regions is completed. When the measurement in all the partial regions is not completed, the flow proceeds to Step S209. On the other hand, when the measurement in all the partial regions is completed, it proceeds to Step S210.

At Step S209, another partial region is targeted. In other words, in accordance with the dividing plan made at Step S202, for example, position information of the partial region which has not been measured is obtained. Subsequently, returning to Step S204, Steps S204 to S208 are repeated. The first and the second measurement steps described above are performed by repeating Steps S204 to S208.

At Step S210, the interference pattern of each partial region is unwrapped. The unwrap means that a phase is joined to be connected when a phase jump is generated between adjacent points. Generally, flood-fill method is often used as an unwrapping process. Thus, Step S210 is an unwrapping step which performs a phase connection (unwrapping) of the interference pattern of each partial region to measure the shape of each partial region.

Figure 12:
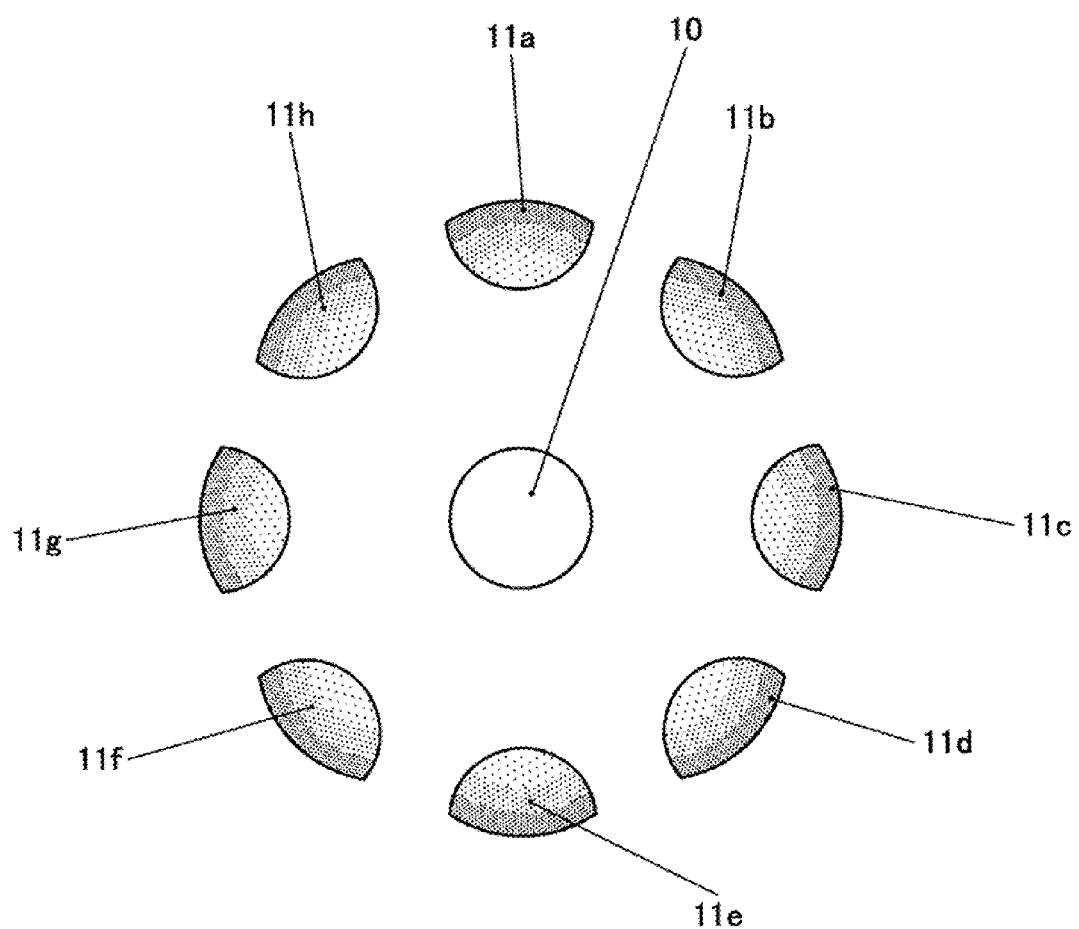
FIG. 12 is a view obtained by unwrapping an interference pattern of each partial region in embodiment 2.

FIG. 12 is a view obtained by unwrapping an interference pattern of each partial region in embodiment 2. The result obtained by unwrapping the interference pattern of each partial region (a center region 10 and peripheral regions 11a to 11h) of the target T is shown in FIG. 12.

At Step S211, the measurement error is corrected. In other words, Step S211 is a correcting step which calculates an error amount from a moving distance of the target T in measuring each partial region to correct a measurement error in each partial region.

At Step S212, the shape of the target T is calculated. In other words, Step S212 is a stitching step which joins the shape of each partial region measured at the unwrapping step.

As shown in FIG. 12, the partial region composed of the center region 10 and the peripheral region 11a to 11h has an overlap region where a part of the partial region is overlapped with an adjacent partial region. Therefore, when calculating the shape of the target T, for example, a stitching is performed by a least squares method so that the error in the overlap region is minimized.

Figure 13:
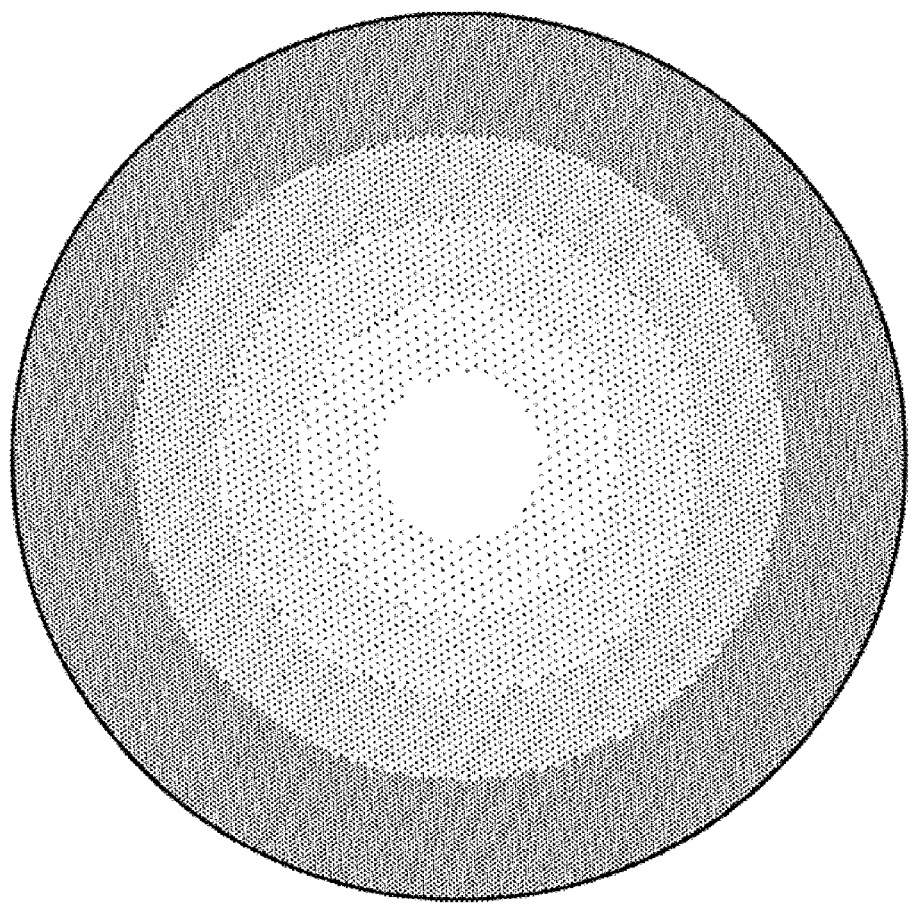
FIG. 13 is a view showing a result obtained by stitching each partial region in embodiment 2.

FIG. 13 is a view showing a result by stitching each partial region in embodiment 2. As shown in FIG. 13, the whole shape of the target T can be reconstructed by stitching each partial region.

Thus, the measurement method of the present embodiment extends the measurement position of the partial region of the target T up to an inverse direction with respect to the focal position 20 (the origin) of the reference spherical surface forming lens TS. According to such a method, the shape where the sign of the radius of curvature is inverted like a gull wing type can be measured. In other words, according to the measurement method of the present invention, the target which has a free-form surface where the sign of the radius of curvature is inverted can be measured without making physical contact.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each of the above embodiments describes that the target T moves in an optical axis direction, but is not limited to this. With regard to the movement of the target T, the distance relative to the reference spherical surface forming lens TS is important. Therefore, the target T may be fixed while the reference spherical surface forming lens TS moves. The reference spherical surface forming lens TS and the target T can also be constituted so that both of them can move.

This application claims the benefit of Japanese Patent Application No. 2008-140559, filed on May 29, 2008, which is hereby incorporated by reference herein in its entirety.

What is claimed is:

1. A measurement method for measuring a shape of a target from an interference pattern generated by interference between a light reflected by the target and a light reflected by a reference spherical surface, the measurement method comprising:

a first step which positions the target in a first region at a light source side with respect to a focal position of the reference spherical surface, measures the interference pattern, and obtains a shape of a part of the target; and a second step which positions the target in a second region opposite to the first region with respect to the focal position of the reference spherical surface, measures the interference pattern, and obtains a shape of a part having a sign of curvature different from a sign of curvature of the part the shape of which is obtained in the first step.

2. A measurement method according to claim 1, further comprising a third step which supplements shape data of the target.

3. A measurement method according to claim 2,
wherein the third step measures the interference pattern while changing a tilt of the target with respect to an optical axis direction of an interferometer.

4. A measurement method according to claim 2,
wherein the third step measures the interference pattern while moving the target in a direction perpendicular to an optical axis direction of an interferometer.

5. A measurement method according to claim 1, further comprising a dividing step which divides the target into a plurality of partial regions,
wherein the measurement method performs at least one of the first and the second steps for each of the partial regions divided at the dividing step.

6. A measurement method according to claim 5, further comprising:
an unwrapping step which unwraps the interference pattern of each of the partial regions to measure a shape of each of the partial regions after performing at least one of the first and the second steps for each of the partial regions to measure the interference pattern of each of the partial regions; and
a stitching step which joins the shape of each of the partial regions measured at the unwrapping step.

7. A measurement method according to claim 6, further comprising a correcting step which corrects a measurement error in each of the partial regions,
wherein the shape of each of the partial regions is joined at the stitching step after correcting the measurement error at the correcting step.

8. A measurement method according to claim 7,
wherein each of the partial regions includes an overlap region which overlaps with at least one of other partial regions, and the shape of each of the partial regions is joined at the stitching step after reducing an error of the overlap regions at the correcting step.

9. A measurement method according to claim 8,
wherein the measurement method reduces the error of the overlap region using least squares method.

10. A measurement method according to claim 1,
wherein the measurement method measures the target having a surface where a sign of curvature is inverted.

11. A measurement method according to claim 1,
wherein, in the first step and the second step, the target is positioned so that a radius of curvature of at least a part of the measurement region of the target matches a radius of curvature of a reference spherical wavefront of the reference spherical surface.

* * * * *